March 16, 1954   W. F. BUTLER   2,672,051
VALVED FLOW METER FOR PARENTERAL SOLUTION INJECTION SETS
Filed Oct. 29, 1951
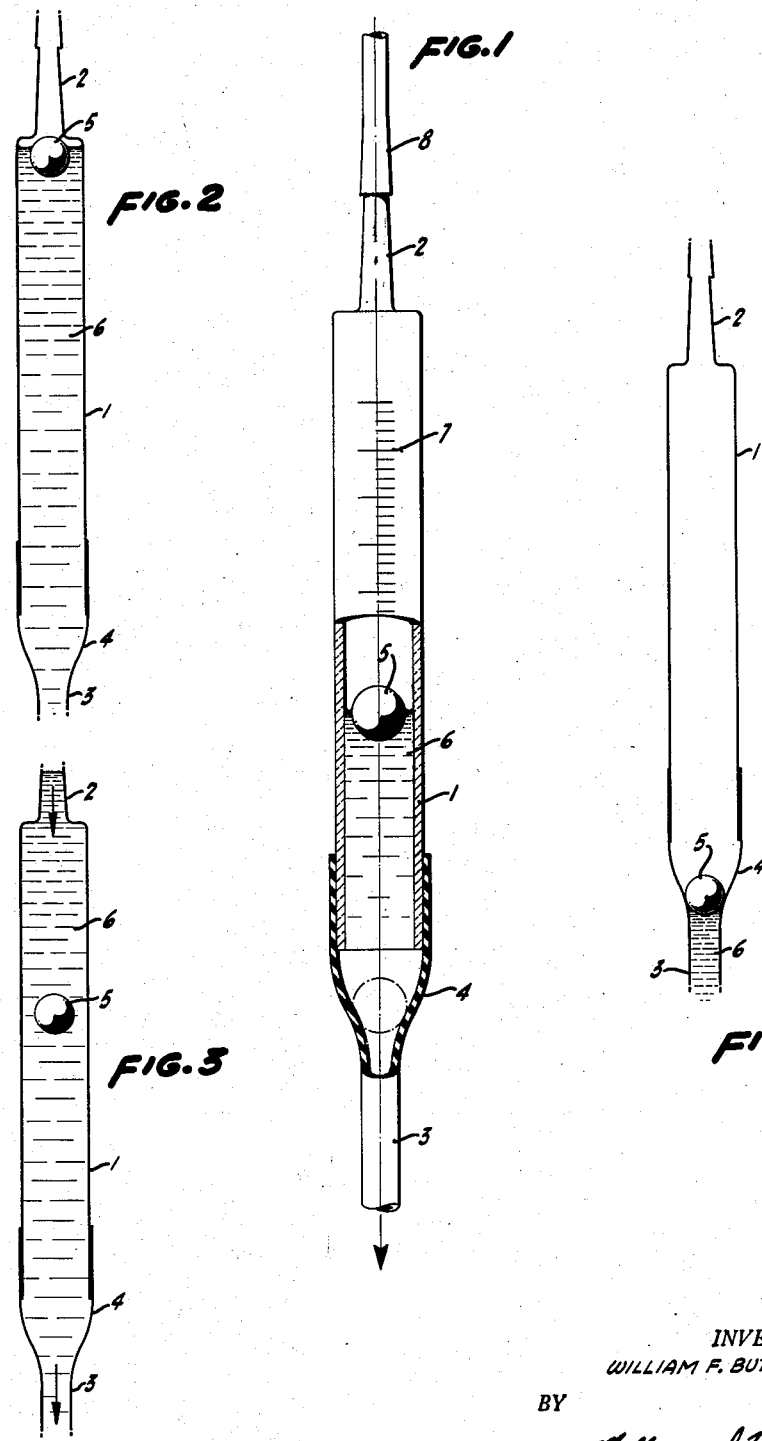
INVENTOR.
WILLIAM F. BUTLER
BY
ATTORNEYS Patented Mar. 16, 1954

2,672,051

UNITED STATES PATENT OFFICE 2,672,051

VALVED FLOW METER FOR PARENTERAL SOLUTION INJECTION SETS

William F. Butler, Oakland, Calif., assignor to Cutter Laboratories, Berkeley, Calif., a corporation of California Application October 29, 1951, Serial No. 253,702

1 Claim. (Cl. 73—209)

This invention relates to parenteral solution injection sets and more specifically to a valved flow meter for determining the rate of flow through the system and for preventing the entrainment of air into the line when the supply of solution has been exhausted, thus avoiding air embolus particularly when the injection is proceeding under the influence of a positive air pressure.

Currently the rate at which an administration of a parenteral solution is proceeding is ascertained by means of a drip meter inserted in the line, no means other than a manually operated pinch valve being provided for closing off the line when the supply of solution has been exhausted.

Among the objects of this invention is the provision of a flow meter including an elongated upstanding transparent chamber formed at its lower end with a valve seat and containing a float check valve, said chamber being provided with a scale calibrated to indicate the rate of flow of the solution at any level of the float.

The invention possesses other advantageous features, some of which, with the foregoing, will be set forth at length in the following description where that form of the invention which has been selected for illustration in the drawings accompanying and forming a part of the specification is outlined in full.

In said drawings, one form of the invention is shown, but it is to be understood that it is not limited to such form, since the invention as set forth in the claim may be embodied in other forms.

Referring to the drawings:

Fig. 1 is a side elevation of a flow meter embodying the objects of my invention, the lower half thereof being shown in section and the ball float being shown in a position which it would assume when the meter is being filled or discharged.

Fig. 2 is a diagrammatic illustration of the flow meter shown in Fig. 1 but with its float in a position indicating substantially no flow therethrough.

Fig. 3 is a view similar to that illustrated in Fig. 2 but showing the meter float in a position indicating a substantial flow through the meter.

Fig. 4 is a view also similar to that illustrated in Fig. 2 but wherein the float is shown in its closed position preventing the flow of air therepast.

The structure as shown in these figures includes an elongated cylindrical transparent chamber made of glass or a suitable plastic and provided at its upper end with a connecting inlet stem or nipple 2.

Stretched over the lower end of the chamber 1 is a section of rubber or plastic tubing 3, arranged to receive an injection needle on its free end. In stretching the tubing 3 over the chamber 1, that portion thereof immediately below the lower end of the chamber 1 is formed into a cone 4.

Disposed within the chamber 1 is a ball float 5 conveniently made of rubber, plastic or cork and having a specific gravity such that it will float on the surface of any body of solution 6 contained within the chamber 1.

Scored, etched or otherwise provided along the length of the chamber 1 is a scale 7, calibrated to indicate directly the rate of flow through the chamber 1 as a function of the position of the ball 5 within the chamber.

The chamber 1 is arranged to be connected through its stem 2 and optionally through a section of tubing 8 with a flask or other suitable source of the parenteral solution to be administered.

In the use of this device air contained in the tubing 3 is first displaced with solution by passing the solution through the chamber and through its associated tubing. This having been done, the pinch valve associated with the tubing 3 in usual manner is closed and the injection needle inserted in the patient. The pinch valve can then be opened to an extent which permits the desired flow of solution to the patient as indicated by the position of the ball 5 and its associated scale 7. Upon the exhaustion of the supply of solution the ball 5 will seat in the cone 4 thereby closing the tubing 3 and preventing the displacement with air of the solution within the tubing 3 below the ball and thereby avoiding the introducing of air bubbles into the patient.

It will therefore be seen that I have provided an exceedingly simple device for determining the rate of flow of solution to the patient and for automatically closing the line upon the exhaustion of the supply of solution so as to avoid the introduction of air into the patient.

I claim:

A combination flow meter and check valve for the administration of parenteral solutions comprising: an elongated transparent float chamber provided at its upper end with a solution inlet; a section of flexible tubing stretched over the lower end of said chamber, the walls of said tubing being downwardly convergent at a point immediately below the lower end of said chamber;

and a ball float accommodated within said chamber and arranged to seat in the downwardly convergent portion of said tubing, the normal inner diameter of said tubing being less than the diameter of said ball float; said chamber being provided with a scale calibrated to indicate the flow of solution through said chamber as a function of the position of said ball within said chamber.

WILLIAM F. BUTLER.

References Cited in the file of this patent

UNITED STATES PATENTS

| Number | Name | Date |
|---|---|---|
| 713,980 | Gill | Nov. 18, 1902 |
| 1,286,046 | Marks | Nov. 26, 1918 |
| 1,424,730 | Linebarger | Aug. 1, 1922 |
| 1,889,705 | Sherwood | Nov. 29, 1932 |
| 2,009,427 | Bentzel | July 30, 1935 |
| 2,129,983 | Bacon | Sept. 13, 1938 |
| 2,367,080 | Wilbar | Jan. 9, 1945 |
| 2,413,352 | Hulsberg | Dec. 31, 1946 |